United States Patent [19]

Pledger et al.

[11] Patent Number: 5,630,281
[45] Date of Patent: May 20, 1997

[54] TEMPLATE FOR ELECTRICAL SERVICE BOX

[76] Inventors: G. Dale Pledger, 163 Albert Ave., N.W., Rome, Ga. 30165; John L. Morris, 736 Compton Rd., Silver Creek, Ga. 30173

[21] Appl. No.: 503,447

[22] Filed: Jul. 17, 1995

[51] Int. Cl.⁶ ............................. B25B 11/00; B23Q 3/00
[52] U.S. Cl. ................ 33/528; 33/613; 33/DIG. 10; 269/904
[58] Field of Search ............................. 33/528, 533, 613, 33/645, 562, DIG. 10; 269/904

[56] References Cited

U.S. PATENT DOCUMENTS

| | | | |
|---|---|---|---|
| D. 250,255 | 11/1978 | Douglas et al. | D10/64 |
| 2,919,913 | 1/1960 | Phair | 33/613 |
| 2,956,798 | 10/1960 | Briggs | 33/DIG. 10 |
| 2,990,172 | 6/1961 | Gianotta | 33/DIG. 10 |
| 3,954,717 | 5/1976 | Tarr | 269/904 |
| 4,059,905 | 11/1977 | Wieting . | |
| 4,890,391 | 1/1990 | Warren | 33/613 |
| 5,040,304 | 8/1991 | Jackson | 33/528 |
| 5,072,523 | 12/1991 | Bennett | 33/528 |
| 5,111,593 | 5/1992 | Gehen, Sr. | 33/613 |
| 5,222,303 | 6/1993 | Jardine | 33/528 |
| 5,361,509 | 11/1994 | Wheeler, Sr. et al. | 33/528 |
| 5,491,901 | 2/1996 | Parrino | 33/528 |

*Primary Examiner*—Christopher W. Fulton
*Attorney, Agent, or Firm*—Thomas, Kayden, Horstemeyer & Risley

[57] ABSTRACT

An electrical utility box locator (11) is provided for convenient and accurate location of electrical utility boxes on the studs of a framed-in wall. The locator has a paddle shaped body (12) with a bottom portion (13) that rests against the floor and against a sole plate of the framed-in wall. The side of the paddle rests against a vertical stud extending upwardly from the sole plate. A recess is formed in the middle section (15) intermediate the top and bottom sections (13 and 14) of the body for receiving the front rim of a utility box to be affixed to the stud. The depth of the recess corresponds to the distance that the forward edge of the utility box is to protrude outwardly from the side of the stud to which it is attached. In use, the locator of this invention is positioned with its bottom portion resting on the floor and against a sole plate, its side resting against a vertical stud, and the side of a utility box in the recess also resting against the stud. The nails of the utility box are then driven into the stud and the locator removed so that the utility box is left properly positioned on the stud.

16 Claims, 3 Drawing Sheets

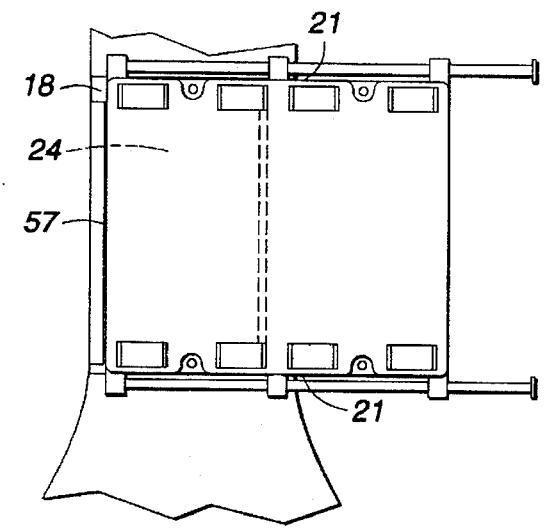
FIG. 5
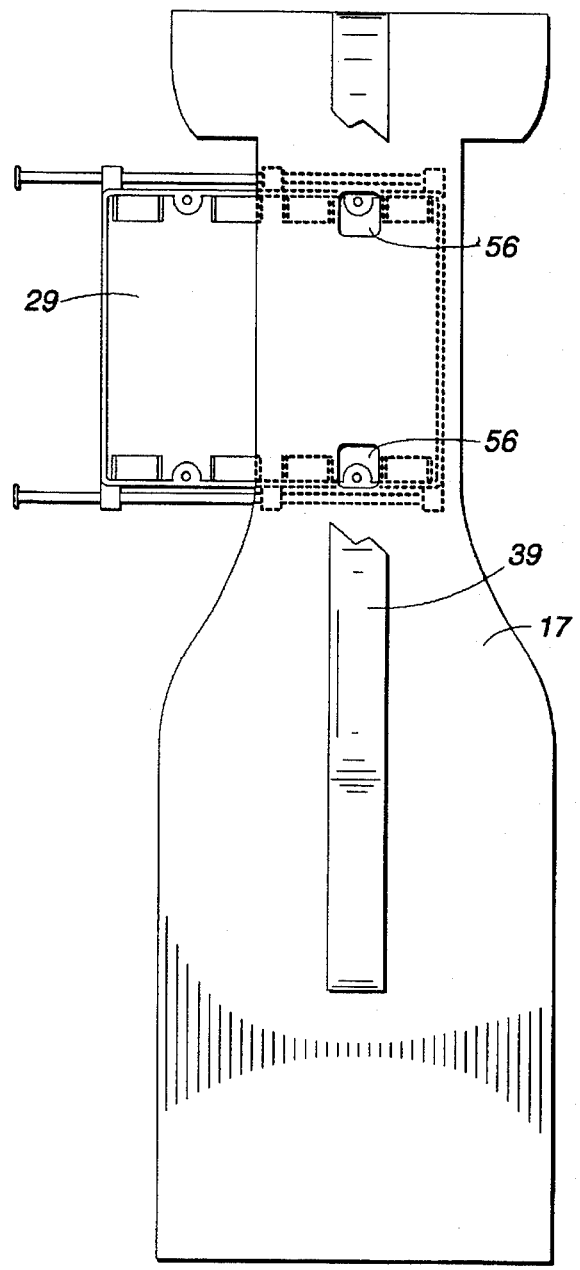
FIG. 4
FIG. 3

TEMPLATE FOR ELECTRICAL SERVICE BOX

TECHNICAL FIELD

This invention relates generally to carpenters' and electricians' tools and more particularly to jigs or templates for the proper positioning of electrical service boxes on the studs of framed-in walls.

BACKGROUND OF THE INVENTION

In the construction of a dwelling or commercial building, it is common to locate electrical outlets along the bottom portions of walls in the building. It is also common to locate electrical switches at a convenient access height on the walls adjacent to doors and other openings. Such electrical outlets and switches are commonly installed within open front rectangular electrical service boxes embedded within the wall. In modern construction, these utility or service boxes typically are made of plastic. The boxes are attached to vertical studs of the framed-in walls before sheet rock or another wall covering is applied to the wall.

Most building codes in force in this country require that electrical outlets be located a standard distance up from the floor, usually 12 inches. Such codes also usually require that electrical switches be located a standard distance from the floor, usually 48 inches. It is important that these guidelines be followed when constructing a building to ensure that the building inspector will approve the electrical roughing-in done by the contractor or electrician.

In addition to the distance of electrical outlets and switches from the floor, construction codes and practices also require that the front rims of the electrical utility boxes housing the switches and outlets protrude outwardly from the sides of studs to which they are attached so that they will extend through holes in the sheet rock to a position substantially flush with the front surface of the sheet rock. This insures that the bare edges of holes formed in the sheet rock to accommodate these switches and outlets are covered by the walls of the utility box. It also important that the utility box, when attached to a stud, be plum with the stud and not cocked or canted from top to bottom. If the utility box is not plum, one of its ends might protrude outwardly from the sheet rock surface with the other end recessed too far inwardly. Such a condition could be dangerous and might not be approved by a building inspector. In addition, utility boxes have threaded screw posts that receive the screws that mount electrical outlets and switches in the boxes. If the boxes are not plum, it can be difficult to thread these attachment screws into the screw posts of the utility boxes.

In the past, electrical utility boxes have been mounted to studs of a framed-in wall manually by carpenters and electricians. Generally, a carpenter will simply measure and mark the position of each box, whereupon the box will be applied manually against the inside surface of a stud. The carpenter then usually eye balls or measures with a scrap piece of sheet rock the protrusion of the front rim of the box from the side of the stud. The box is then held with one hand while nails fastening the box to the stud are driven by hammer with the other hand. Obviously, this manual method of roughing-in electrical boxes is time consuming, not economical, and can result in substantial errors in placement and orientation depending upon the skill of the particular carpenter or electrician installing the boxes. It is difficult when using this manual method to position the boxes accurately so that they are plum with the studs to which they are fixed.

Some attempts have been made to provide tools or gauges for positioning electrical utility boxes accurately within a wall. One example of such an attempt is illustrated in U.S. Design Pat. No. 250,255 of Douglas et al. While there is no discussion in this patent of the use of the device shown therein, it is presumed that the electrical box setting gauge disclosed in this patent would be placed on the floor with an electrical utility box mounted on the U-shaped bracket at the top of the gauge. With the gauge and utility box so positioned, the box would be nailed to the stud.

While the device of Douglas et al. appears to be a step in the right direction, it nevertheless appears to have problems and shortcomings inherent in its design. For example, the bottom of the gauge, which apparently could rest on the floor during use, is narrow and does not provide sufficient rotational stability for the gauge. In addition, all of the surfaces of this gauge which bear against the floor and against the stud are below the utility box, thus resulting in inadequate stability for the electrical box when the electrician nails the box to a stud. Also, there is no means on the gauge of Douglas for aligning the gauge in the proper vertical orientation against the stud before the electrical utility box it is attached to a stud. The user of the Douglas device apparently would have to eyeball the vertical alignment of the device before nailing the box to the stud. The inherent instability of the Douglas device likely would result in wobbling or movement of the gauge during use, thus tending to degrade the reliability and accuracy of the gauge. Additionally, the gauge of Douglas appears to be nonfunctional since there is no provision on the box support bracket for accommodating the inwardly protruding screw posts and wire securing mechanisms on the interior of common utility boxes.

Thus, there exists a need for an improved jig usable by carpenters and electricians to rough-in electrical outlet boxes in the framed-in walls of a building structure. Such a jig should be inherently very stable during use so that any movement of the jig as the boxes are being attached is eliminated. The jig should be simple and convenient to use and should ensure that utility boxes are fixed to the sides of studs at precisely the proper height above the floor, with precisely the correct protrusion of the front rim of the box from the stud, and with the box aligned plum with the stud. The jig should further be economical to produce in quantity, rigid enough to withstand commercial use, and should be equally usable to place single electrical utility boxes or multiple ganged utility boxes. It is to the provision of such a jig that the present invention is primarily directed.

SUMMARY OF THE INVENTION

Briefly described, the present invention comprises a jig for use by a carpenter or electrician during construction of a building to position electrical utility boxes against appropriate studs of a framed-in wall. Such framed in walls are usually formed by 2×4 wooden timbers and have a sole plate resting on the floor of the building and vertical studs extending upwardly from the sole plate. The jig of this invention is adapted to position each electrical utility box against its respective stud at a first predetermined distance from the floor of the building and with the forward rim of the utility box protruding a second predetermined distance from the face of the stud to accommodate the thickness of wall covering to be applied to the framed-in wall at a later time.

The jig of this invention includes a generally paddle shaped body having a wide bottom end portion, a top end portion, and a narrow middle section intermediate its top and bottom end portions. The body can be formed from wood, plastic, or other appropriately rigid material and has a predetermined thickness, a front face, and a rear face. A rectangular recess is formed in the front face of the jig body in the narrow middle section thereof. The recess extends into the body of the jig a distance substantially equal to the distance that the front rim of a utility box is to protrude from the face of a stud to which it is attached. The recess is further sized and shaped to receive the forward rim of an electrical utility box with the forward rim extending into and seating against the bottom of the recess. The recess is located a distance from the bottom of the body substantially equal to the first predetermined distance that utility boxes are to be located above the floor.

A generally box-shaped guide block of smaller breadth than the recess is centered in and protrudes outwardly from within the recess a predetermined distance. The guide block is sized and shaped so that a common plastic utility box can be telescopically mounted over the block. The top and bottom of the block bears against the top and bottom inside surfaces of the utility box to hold the box firmly but releasably in place within the recess. Appropriate slots and grooves are formed in the guide block to accommodate the screw posts and wire securing mechanisms within the utility box. Thus, an electrical utility box can be releasably secured within the recess by pressing it into the recess over the guide block.

A positioning block is located below the guide block and also protrudes from the front face of the jig body. The positioning block has opposed sides that are vertically aligned with at least one side of a utility box positioned about the guide block and in the recess. The intermediate section of the body is narrowed with respect to the top and bottom sections to allow access by a hammer for fastening utility boxes to studs.

In use, an electrical utility box is mounted telescopically about the guide block and into the recess as described above. A single utility box will fit completely within the recess. However, a double or triple ganged utility box can also fit in the recess with one side aligned vertically with a side of the positioning block and with its other side protruding outwardly from the side of the jig. With the box loaded, the bottom of the jig is placed on the floor adjacent to a framed-in wall with one side of the utility box and a side of the positioning block bearing against a vertical stud of the wall. The bottom portion of the front face of the jig bears against the sole plate of the wall and the vertical stud bears against and extends up along the side of the front face. The top of the jig also bears against the stud above the position of the utility box.

With the jig so located, the utility box mounted within the recess of the jig is positioned at the proper height above the floor. In addition, the box is properly oriented with its front rim protruding precisely the proper distance from the stud and with the box vertically plum with the stud. As the final visual check before nailing the utility box is firmly seated within the recess and thus properly positioned on a stud, viewing ports are provided through the jig in the region where the front rim of the box rests in the recess so that a user can confirm visually through the viewing ports that the utility box is properly seated.

With the jig of this invention positioned as described, the multiple bearing surfaces against the floor, sole plate, and vertical stud ensures that the jig and utility box are solidly held in place so that neither tends to move or rotate as the utility box is fixed to the stud with nails. When the box is nailed to the stud, the jig is simply pulled away leaving the box at its proper position and orientation on the stud.

For positioning switch boxes a greater distance from the floor, an elongated rod can be inserted into a bore formed in the bottom of the jig body to raise the jig to the proper height above the floor for switch boxes.

It is thus an object of this invention to provide an improved jig for positioning electrical utility boxes at the proper location and orientation in framed in walls.

It is another object of this invention to provide a utility box locating jig that is firmly and solidly held in place during use so that the jig and the box do not move around.

An additional object of the invention is to provide an improved utility box locating jig that ensures without measuring or calculation that an electrical utility box is always positioned at the proper height above the floor and with its front rim protruding the proper distance from the stud to accommodate sheet rock or other wall coverings.

A further object of the invention is to provide such a jig that is simple and easy to use by even the least skilled carpenter or electrician and that produces consistent reliable results.

A still further object of the invention is to provide a utility box locating jig that is economical to produce and that is sufficiently rigid to withstand continuous commercial use by carpenters and electricians.

These and other objects, features, and advantages of the present invention will become more obvious upon review of the detailed description presented herein below taken in conjunction with the accompanying drawings, which are briefly described as follows.

BRIEF DESCRIPTION OF THE DRAWINGS

FIG. 3 is a side elevational view of an electrical utility box fixed to the stud of a framed-in wall and illustrating the protrusion of the front rim of the box from the stud and the attachment of the box with nails.

FIG. 4 is a view from the back side of the jig of this invention illustrating the positioning and use of the viewing ports for confirming that a utility box is fully seated within the recess of the invention prior to attachment to a stud.

FIG. 5 is a front, partially cut away view of the jig illustrating placement of a ganged utility box within the recess for positioning an attachment to a stud.

DETAILED DESCRIPTION OF THE PREFERRED EMBODIMENT

Figure 1:
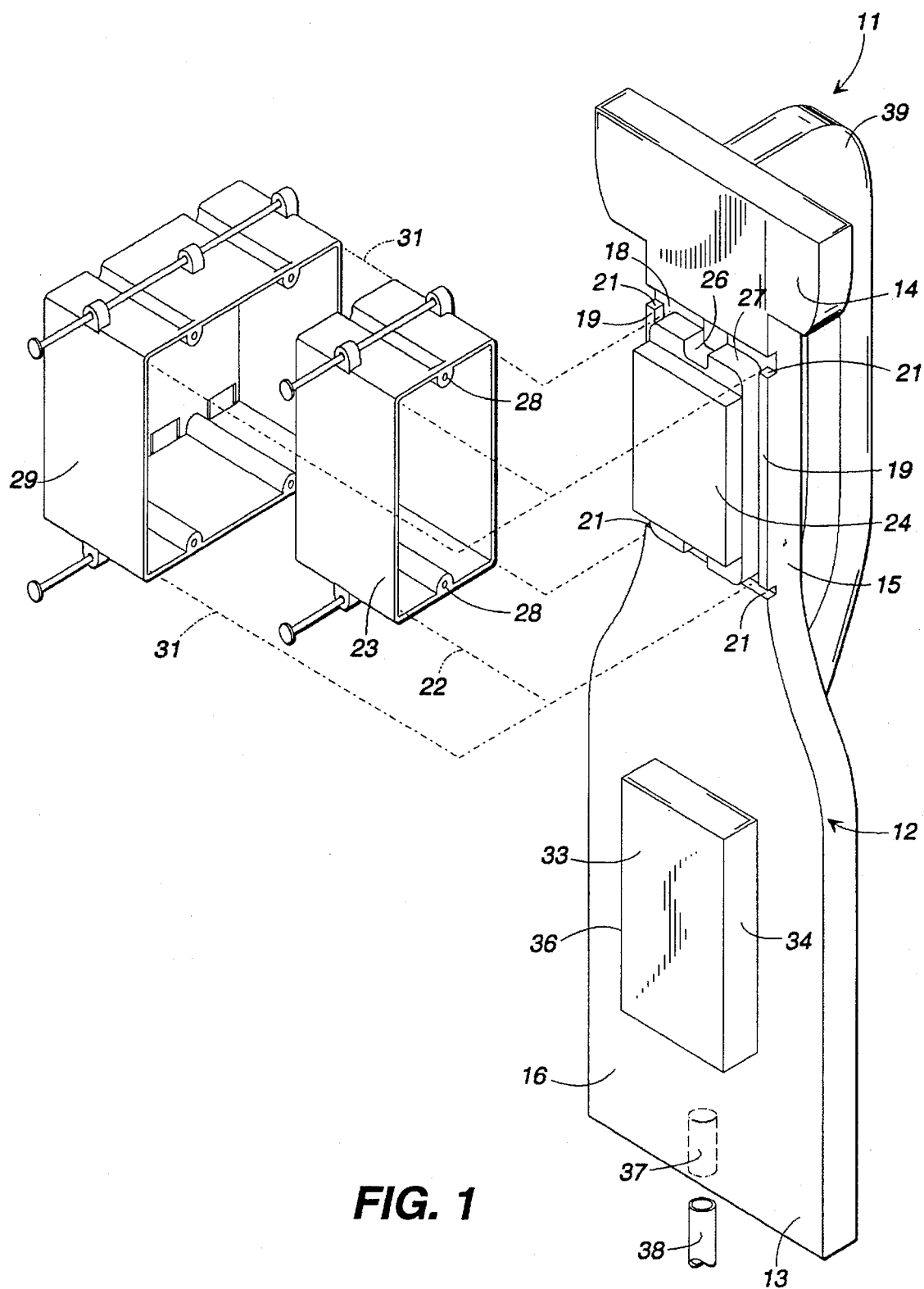
FIG. 1 is a perspective partially exploded view illustrating an electrical utility box positioning jig that embodies principles of the present invention in a preferred form.

Referring now in more detail to the drawings, in which like numerals refer to like parts throughout the several views, FIG. 1 illustrates an electrical utility box positioning jig that embodies principles of the present invention in a preferred form. The jig 11 comprises a generally paddle shaped body 12 having a bottom end portion 13, a top end portion 14 and a middle section 15 intermediate the top and bottom end portions. The body 12 is generally planar in shape and can be fabricated from a wooden board having a predetermined thickness. Alternatively, the body 12 can be fabricated from molded plastic or another suitably rigid material. The middle section of the body 12 is seen to be narrowed with respect to the bottom and top portions to facilitate the attachment with hammer and nails of a utility box to its stud as described more fully below.

The body 12 of the jig 11 has a generally flat front face 16 and a generally flat rear face on the opposite side of the jig from the front face (see FIG. 4). The narrowed intermediate section of the jig body is machined or otherwise formed to have a recess 18 that extends a predetermined distance into the body 12. The recess 18 is bounded on its top and bottom by walls that define the recess and is bounded on its side by shoulders 19. Slots 21 are formed in the shoulders at their top and bottom ends. The depths of the slots 21 corresponds to the depth of the recess 18. The width of the slots 21 is selected to allow the walls of a double or triple ganged utility box seated within the recess to extend through slots on one side of the jig as detailed below. The dimensions of the recess 18 are selected to correspond substantially to the outside dimensions of a single outlet electrical utility box. Thus, as illustrated at 22 in FIG. 1, a single outlet electrical utility box 23 can be pressed into the recess 18 within the front rim of the utility box seated against the floor of the recess.

A generally block-shaped guide block 24 extends out of the recess 18 and is centered within the bounds of the recess. The guide block 24 is sized so that a common electrical utility box 23 can be telescopically received onto and over the guide block with at least the top, bottom, and one side of the guide block firmly engaging corresponding walls of the utility box. Channels 26 and cut-out shoulders 27 are provided on the guide block to accommodate the screw posts and electrical wire securing mechanism in the interiors of common electrical utility boxes.

With the just described configuration of the recess 18 and guide block 24, it will be seen that a common utility box 23 can be pressed into the recess 18 so that its forward rim rests against the floor of the recess around the guide block 24. The guide block 24 bears against the inner surfaces of the utility box to create a friction fit between the guide block and the utility box. In this way, the utility box is held firmly but releasably within the recess 18 once it is pressed by a user therein. The screw posts 28 of the utility box and the interior wire securing mechanisms (not shown) are accommodated by the channels 26 and the cut out shoulders 27 of the guide block, respectively.

The slots 21 allow the recess of the jig to receive and hold double or triple ganged utility box 29. When used with such utility boxes, the box is moved and pressed into the recess 18 as indicated by dash lines 31 in FIG. 1. When so inserted, the top and bottom of the box 29 bears against the top and bottom of the guide block 24 and one side of the utility box bears against a corresponding side of the guide block. The other end of the double or triple ganged utility box extends through the slots 21 beyond the edge of the jig as indicated by lines 32 in FIG. 1. Since the screw posts of a ganged utility box are at a standard distance from one side thereof, the ganged utility box, when inserted into the recess, is positioned with its screw posts located in the channels 26 and any interior wire securing mechanisms accommodated by the cut-out shoulders 27.

A positioning block 33 is mounted on the front face 16 of the jig adjacent the lower end portion 13 thereof. The positioning block 33 has a first side 34 and a second side 36 and preferably extends outwardly from the front face of the jig approximately ¾ of an inch. The positioning block 33 is sized so that its first side 34 and its second side 36 align vertically with the sides of a single outlet utility box 23 positioned within the recess 18. When a ganged utility box 29 is positioned within the recess as described above, one or the other of the sides 34 and 36 will align with the side of the utility box that lies within the recess while the other side of the ganged box will extend beyond edge of the jig.

An upwardly extending vertical bore 37 is formed in the bottom of the jig and extends a predetermined distance into the interior thereof. An elongated rod 38 is sized to be received within the vertical bore 37, which forms a rod receiving bore. The rod 38 can be inserted and removed from the bore 37 at will for purposes described in more detail below.

A handle 39 is secured to and protrudes rearwardly from the rear face of the jig. The handle 39 is conveniently sized and located to allow a worker to grasp the jig and manipulate it as necessary to position an electrical utility box properly for attachment to the stud of a framed-in wall.

Figure 2:
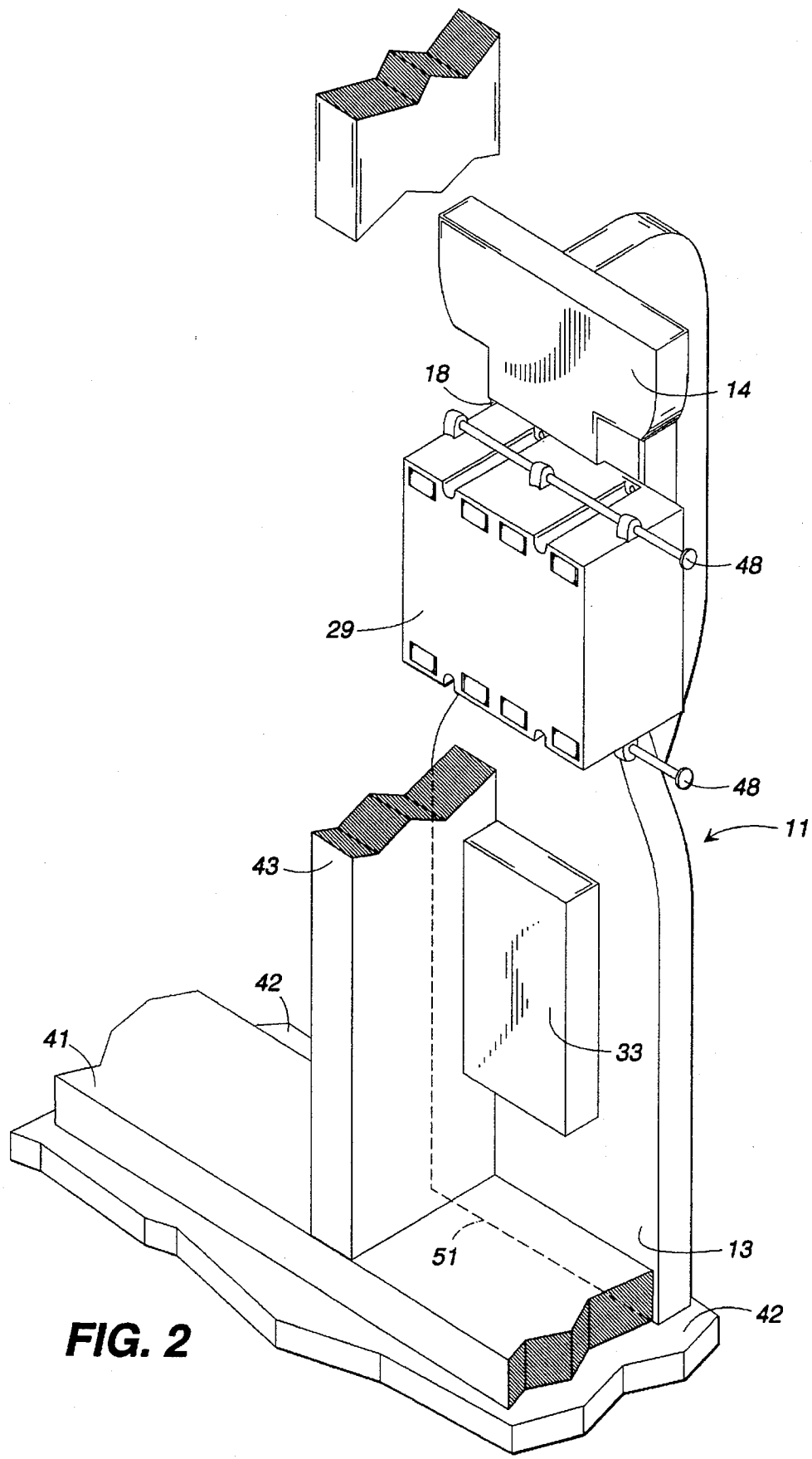
FIG. 2 is a perspective illustration showing the sole plate and stud of a framed-in wall, and depicting use of the present invention for positioning and attaching an electrical utility box.

FIG. 2 illustrates operation of the present invention for positioning utility boxes against studs of framed-in walls. Such walls typically are formed with a sole plate 41 that rests on and is secured to the floor 42 of a building structure. One of a series of spaced vertical studs 43 is secured to the sole plate and extends upwardly therefrom to a top plate of the wall (not shown). In most instances, the sole plate and studs are made from 2×4 timbers. However, different size timbers, such as 2×6 timbers, might also be used as well as metal or even extruded plastic studs and plates.

Most building codes require that electrical outlet boxes be positioned a standard distance, usually 12 inches, from the floor of the building in which they are installed. In addition, the front rim of utility boxes must protrude beyond the side of the stud to which they are attached in order to accommodate wall coverings such as sheet rock that is to be applied to the wall at a later time. For sheet rock installation, the forward rim of the utility boxes must protrude from the stud approximately 7/16 of inch. The sheet rock itself is ½ inch thick, which leaves the rim of the box recessed 1/16 inch behind the front surface of a sheet rock wall applied to the framed-in wall. It is important when installing electrical utility boxes that the boxes be plum with the studs and not cocked from top to bottom. This insures that electrical switches and outlets and their associated cover plates will be squarely mounted onto the wall and that the screw posts of the utility boxes will extend perpendicular with respect to the wall to receive attaching screws properly. Such mounting of an electrical utility box onto a stud is illustrated in FIG. 3. Here, the front rim 46 of the utility box is seen to protrude by a distance 44 from the side 47 of the stud 43. Most modern utility boxes are secured to the stud by means of nails 48 that pass through brackets 49 on the utility box and that are driven into the stud 43 with a hammer.

Referring back to FIG. 2, a double or tripe ganged electrical utility box 29 is seen to have been pressed into the recess 18 of the jig 11 where it is firmly but releasably held as described above. For positioning the utility box, the jig 11 is placed with its bottom edge 51 resting firmly on the floor adjacent the sole plate 41 and stud 43 where the box 29 is to be installed. In this position, the bottom end portion 13 of the jig's front face rests firmly against the sole plate 41. Further, the left side of the front face of the jig rests firmly against the vertical stud 43 at the bottom end portion of the jig below the utility box 29. Similarly, the flanged top end portion 14 of the jig rests firmly against the stud 43 above the location of the utility box 29. When so positioned, the left side of the utility box 29 that is positioned within the recess 18 bears against the side of the stud 43. Also, since the positioning block 33 is vertically aligned with the recess 18, the side of the positioning block corresponding to the side of the utility box resting against the stud also bears against the stud at a position below the utility box.

Thus the bottom edge of the jig 51 forms a first bearing surface for bearing against the floor of the building structure. The lower portion and side of the front face forms a second bearing surface that bears against the sole plate and stud of a framed-in wall in which a utility box is to be installed. The flanged upper portion of the jig forms a third bearing surface that bears against the stud at a position above the utility box. Finally, the side of the positioning block 33 forms a fourth bearing surface that bears against the side of the stud at a position below where the utility box bears against the stud. The conjunction of all of these bearing surfaces functions to hold the entire jig and a utility box mounted therein firmly and securely in place. The height of the recess above the bottom edge 51 of the jig ensures that the utility box is positioned at the proper height above the floor of the building. In addition, the depth of the recess 18 into which the front rim of the utility box is seated ensures that when the jig and box are positioned as shown in FIG. 2, the front rim of the box protrudes from the stud as shown in FIG. 3.

Further, with the box fully seated into the recess, the box is assured to be plum with the stud as well.

Accordingly, it will be seen that a contractor or electrician roughing in electrical utility boxes need only press a utility box into the recess, position the jig as shown in FIG. 2, and, with his hammer, drive the nails 48 into the stud. The jig is then simply pulled away from the box and loaded with a new box to be attached at a different location.

FIG. 4 is a view showing the back face 17 of the jig with handle 39 cut away to illustrate another aspect of this invention. Specifically, it is always desirable to double check before installing a utility box to assure that the box is fully seated within the recess. This, in turn, assures that the forward rim of the box will properly protrude from the stud and be aligned plum therewith. To facilitate such a double check, a pair of viewing ports 56 extend through the jig at locations where the top and bottom rim of the utility box seat within the recess. Just prior to installing the utility box, a user need only glance through the viewing ports 56 to assure that the rim of the utility box is fully seated within the recess. This provides a double check to prevent mispositioned or cocked utility boxes that would have to be removed and replaced.

FIG. 5 illustrates the mounting of a two or three ganged electrical utility box within the recess for installation against a stud. When so mounted, the top and bottom of the utility box bear against the top and bottom of the guide block 24 and one side 57 of the utility box rests within the recess 18 against a side of the guide bock 24. The top and bottom forward rim of the utility box extends through the slots 21 on the other side of the jig and the other end of the box is positioned remote from the side of the jig. With this configuration, the utility box in FIG. 5 can be fixed to a stud on the left hand side of the figure. If it is desired to fix the box to a stud on the right hand side of the figure, the box is simply removed, rotated 180°, and installed within the recess with one side protruding from the left side of the jig. The jig can then be positioned against a stud on its right side and the box attached by driving the nails into the stud. In this way, the jig of the present invention is fully reversible for fastening electrical utility boxes to either side of a stud in a framed-in wall.

If is desired to install, for example, switch boxes at a height greater than that of electrical outlet boxes, the rod 38 (FIG. 1) is simply inserted into the vertical bore 37 in the bottom of the jig. The rod 38 is sized so that when its bottom end rests on the floor, a utility box positioned within the recess is located at the proper height for switches or other electrical appliances.

The invention has been described herein in terms of preferred embodiments and methodologies. It should be understood, however, that various additions, deletions, and modifications to the illustrated embodiment might well be made by those of skill in this art without departing from the spirit and scope of the invention as set forth in the claims.

We claim:

1. A jig for use by a carpenter or electrician during construction of a building to position electrical utility boxes against appropriate studs of a framed-in wall of the type that is formed with a sole plate resting on a floor of a building and vertical studs extending upwardly from the sole plate, said jig positioning each of the electrical boxes against its respective stud at a first predetermined distance from the floor of the building and with a forward rim of the utility boxes protruding a second predetermined distance from the side of the stud to accommodate a thickness of a wall covering to be applied to the studs, said jig comprising:

a body having a bottom end portion, a top end portion, and a middle section intermediate said top end and said bottom end portions, said body having a predetermined thickness, a front face, and a rear face;

a recess formed in said front face of said body in the middle section thereof with said recess extending into said body a distance substantially equal to said second predetermined distance, said recess being sized and shaped to receive the forward rim of an electrical utility box with the forward rim extending into the recess;

means on said body for releasably holding an electrical utility box firmly in place with its forward rim extending into said recess;

said bottom end portion of said body being formed to define a first bearing surface for resting on the floor of a building adjacent to a framed-in wall section in which an electrical utility box is to be installed, and a second bearing surface for bearing against the sole plate of the framed-in wall substantially at the location of a wall stud to which the electrical utility box is to be affixed, and a third bearing surface formed in the top end portion of said body for bearing against the wall stud to which an electrical utility box is to be installed at a position above the location of the electrical utility box;

wherein said intermediate section of said body is narrowed in the region of said recess to allow access to an electrical utility box for hammering the box in place on its stud;

whereby the jig can be loaded with an electrical utility box and placed on the floor adjacent a framed-in wall with the utility box positioned against a wall stud and with the first, second, and third bearing surfaces of the body resting firmly against the floor, sole plate, and stud respectively to securely and accurately position the electrical utility box against the stud whereupon the box can be fastened to the stud with nails.

2. A jig as claimed in claim 1 and further comprising handle means on the rear face of said body for grasping by the carpenter or electrician to position and hold the jig firmly in place during use.

3. A jig as claimed in claim 1 and wherein said means for releasably holding an electrical utility box firmly in place with its forward rim extending into said recess comprises a guide block protruding outwardly from said recess with said guide block being sized for telescopically receiving an electrical utility box over said guide block with said guide block bearing against at least a portion of the inside of the utility box to hold the utility box through friction with said guide block within the recess.

4. A jig as claimed in claim 3 and wherein said guide block is substantially block shaped.

5. A jig as claimed in claim 1 and further comprising means on said body for visually confirming that an electrical utility box is fully seated and bottomed in said recess prior to fixing the utility box to its stud.

6. A jig as claimed in claim 5 and wherein said means for visually confirming comprises at least one viewing port formed through said body at a location where the front rim of an electrical utility box in said recess is visible through said port, said port providing a visual check that the utility box rim is fully seated within the recess.

7. A jig as claimed in claim 6 and wherein two of said ports are formed through said body.

8. A jig as claimed in claim 7 and wherein one of said ports is formed at the top of said recess and the other one of said ports is formed at the bottom of said recess to provide a visual check that the top of an electrical utility box is fully seated within the recess and simultaneously that the bottom of the utility box is fully seated within the recess.

9. A jig as claimed in claim 1 and further comprising means for aligning the bottom end portion of said body vertically with a stud.

10. A jig as claimed in claim 9 and wherein said means for aligning comprises a positioning block located on said front face of said body at the bottom end portion thereof, said positioning block having a bearing surface that is substantially vertically aligned with the side of an electrical utility box seated in said recess, said positioning block and the side of a seated utility box both resting against a stud during installation of the utility box to align and steady the utility box for attachment with nails to the stud.

11. A jig as claimed in claim 1 and further comprising means for adjusting the position above a floor at which electrical boxes are located with said jig.

12. A jig as claimed in claim 11 and wherein said means for adjusting comprises a rod of predetermined length and a rod receiving bore formed in said bottom end of said body for receiving one end of said rod, the other end of said rod resting on the floor to elevate said jig relative to the floor during installation of an electrical utility box therewith.

13. An electrical utility box locator comprising:
   a body having a first bearing surface for bearing against the floor of a building in which a utility box is to be located, a second bearing surface for bearing against the sole plate of a framed in wall in which the utility box is to be located, and a third bearing surface for bearing against a vertical stud against which the utility box is to be fixed, said first, second, and third bearing surfaces providing three-point support for said locator to hold the locator firmly in place against the framed-in wall;
   means on said locator for releasably holding an electrical utility box in place against a stud of the framed-in wall at a predetermined distance from the floor and with the front rim of the utility box protruding a predetermined distance from the face of the stud to accommodate the thickness of wall board to be applied to the framed-in wall, said means for releasably holding an electrical utility box in place comprising a recess formed in said locator with said recess being sized and shaped to receive the front rim of a utility box; and
   a fourth bearing surface vertically aligned with a side of a utility box seated in said recess for bearing against the stud to which the utility box is positioned for precise vertical alignment of the utility box against the stud.

14. An electrical utility box locator as claimed in claim 13 and further comprising a pair of viewing ports formed in said locator in the region where the front rim of a utility box seats within said recess to allow visual confirmation that a utility box if fully seated within said recess before the utility box is fastened to a stud.

15. An electrical utility box as claimed in claim 13 and further comprising handle means on said locator for manual manipulation and locating of said locator in place against a framed-in wall.

16. A jig for use by a carpenter or electrician during construction of a building to position electrical utility boxes against appropriate studs of a framed-in wall of the type that is formed with a sole plate resting on a floor of a building and vertical studs extending upwardly from the sole plate, said jig positioning each of the electrical boxes against its respective stud at a first predetermined distance from the floor of the building and with a forward rim of the utility boxes protruding a second predetermined distance from the side of the stud to accommodate a thickness of a wall covering to be applied to the studs, said jig comprising:
   a body having a bottom end portion, a top end portion, and a middle section intermediate said top end and said bottom end portions, said body having a predetermined thickness, a front face, and a rear face;
   a recess formed in said front face of said body in the middle section thereof with said recess extending into said body a distance substantially equal to said second predetermined distance, said recess being sized and shaped to receive the forward rim of an electrical utility box with the forward rim extending into the recess;
   means on said body for releasably holding an electrical utility box firmly in place with its forward rim extending into said recess;
   said bottom end portion of said body being formed to define a first bearing surface for resting on the floor of a building adjacent to a framed-in wall section in which an electrical utility box is to be installed, and a second bearing surface for bearing against the sole plate of the framed-in wall substantially at the location of a wall stud to which the electrical utility box is to be affixed, and a third bearing surface formed in the top end portion of said body for bearing against the wall stud to which an electrical utility box is to be installed at a position above the location of the electrical utility box;
   means for aligning the bottom end portion of said body vertically with a stud comprising a positioning block located on said front face of said body at the bottom end portion thereof, said positioning block having a bearing surface that is substantially vertically aligned with the side of an electrical utility box seated in said recess, said positioning block and the side of a seated utility box both resting against a stud during installation of the utility box to align and steady the utility box for attachment with nails to the stud;
   whereby the jig can be loaded with an electrical utility box and placed on the floor adjacent a framed-in wall with the utility box positioned against a wall stud and with the first, second, and third bearing surfaces of the body resting firmly against the floor, sole plate, and stud respectively to securely and accurately position the electrical utility box against the stud whereupon the box can be fastened to the stud with nails.

* * * * *